United States Patent

Desgagné

[19]

[11] Patent Number: 6,081,713
[45] Date of Patent: Jun. 27, 2000

[54] METHOD OF SELECTIVELY DIRECTING A MOBILE STATION TO RETRY SYSTEM ACCESS IN A RADIO TELECOMMUNICATION SYSTEM

[75] Inventor: Michel Desgagné, Quebec, Canada

[73] Assignee: Telefonaktiebolaget LM Ericsson, Stockhom, Sweden

[21] Appl. No.: 09/081,481

[22] Filed: May 18, 1998

[51] Int. Cl.$^7$ ..................................... H04Q 7/20
[52] U.S. Cl. ................... 455/436; 455/437; 455/439; 455/63
[58] Field of Search .................. 455/436, 437, 455/438, 439, 63, 453, 446, 447, 525; 370/331, 332

[56] References Cited

U.S. PATENT DOCUMENTS

| | | | |
|---|---|---|---|
| 4,613,990 | 9/1986 | Halpern | 455/436 |
| 4,670,899 | 6/1987 | Brody et al. | 455/436 |
| 5,241,685 | 8/1993 | Bodin et al. | 455/436 |
| 5,287,545 | 2/1994 | Kallin | 455/33.1 |
| 5,497,504 | 3/1996 | Acampora et al. | 455/33.2 |
| 5,509,051 | 4/1996 | Barnett et al. | 379/59 |
| 5,697,053 | 12/1997 | Hanly | 455/436 |
| 5,794,157 | 8/1998 | Haartsen | 455/63 |
| 5,911,122 | 6/1999 | Corriveau et al. | 455/436 |

FOREIGN PATENT DOCUMENTS 2287614A  9/1995  United Kingdom .

*Primary Examiner*—Dwayne D. Bost
*Assistant Examiner*—Quochien B. Vuong
*Attorney, Agent, or Firm*—Smith & Danamrai, P.C.

[57] ABSTRACT

A method of reducing co-channel interference in a cellular telecommunication system having a congested serving cell, a plurality of neighbor cells controlled by a mobile switching center (MSC), and an accessing mobile station attempting to access the cellular system in the serving cell. The MSC fetches signal strength information from mobile stations camped on the serving cell's digital control channel (DCCH). The signal strength information includes received signal strengths at the camped mobile stations from the serving cell and the neighbor cells. The MSC then fetches signal strength information from busy mobile stations involved in on-going calls in the serving cell. For each busy and camped mobile station, the expected downlink signal strength from each neighbor cell is subtracted from the maximum downlink signal strength from the serving cell. The mobile station/neighbor cell combination with the numerically least difference causes the least co-channel interference when the identified mobile station is moved into the identified neighbor cell. If the identified mobile station is the accessing mobile station, the MSC redirects the accessing mobile station to access the cellular system in the identified neighbor cell. If the identified mobile station is a busy mobile station involved in a call, the MSC forces a handoff of the identified mobile station to the identified neighbor cell.

10 Claims, 4 Drawing Sheets

METHOD OF SELECTIVELY DIRECTING A MOBILE STATION TO RETRY SYSTEM ACCESS IN A RADIO TELECOMMUNICATION SYSTEM

BACKGROUND OF THE INVENTION

1. Technical Field of the Invention

This invention relates to telecommunication systems and, more particularly, to a method of selectively directing a mobile station to retry system access in a radio telecommunication system.

2. Description of Related Art

Existing cellular radio telecommunication systems perform a function known as directed retry. If a particular cell is congested (i.e., all of the cell's traffic channels are occupied) when a mobile station (MS) attempts to access the system, the serving mobile switching center (MSC) may direct the MS to retry the access in a neighboring cell. When a directed retry is performed, there can be an adverse impact on the level of co-channel interference when the MS begins operating in a different cell than the cell with the best signal strength. This, in turn, may cause a decrease in the general voice quality achieved in the system.

Although there are no known prior art teachings of a solution to the aforementioned deficiency and shortcoming such as that disclosed herein, U.S. Pat. No. 5,509,051 to Barnett et al. (Barnett); U.S. Pat. No. 5,287,545 to Kallin (Kallin); and U.S. Pat. No. 5,497,504 to Acampora et al. (Acampora); and UK Patent Application GB 2,287,614A to Ueno et al. (Ueno) discuss subject matter that bears some relation to matters discussed herein.

Barnett discloses a method of prioritizing neighboring cells for handoff in a cellular telecommunication system. In FIG. 3, the method is shown to involve comparing the signal strength in the serving cell to the signal strength in each neighboring cell, and establishing a graph with a handoff region. Neighboring cells are then prioritized by signal strength, with cells falling to the right side of the graphed handoff region having higher priority for handoff. Barnett, however, does not teach or suggest a method within a mobile switching center (MSC) which collects signal strength measurements (of the serving cell and of neighboring cells) both from MSs which are involved in calls and from MSs which are currently camped on the Digital Control Channel (DCCH) waiting for system access. Likewise, Barnett does not teach or suggest a method which utilizes this measurement information to either handoff MSs currently involved in calls or redirect the access of camped MSs to target cells in such a way as to minimize co-channel interference in the cellular system.

Kailin discloses a method and apparatus for advanced directed retry in which a directed retry message is sent to a mobile station which attempts to access a cellular system in a first cell which is congested. The mobile station then attempts to access the system in a second cell, but if a traffic channel becomes available in the first cell, the call is established in the first cell, thereby reducing interference in the system. However, Kallin does not teach or suggest a method which collects signal strength measurements (of the serving cell and of neighboring cells) both from MSs which are involved in calls and from MSs which are currently camped on the DCCH waiting for system access. Additionally, Kallin does not teach or suggest a method which utilizes this measurement information to calculate whether to hand off a MS currently involved in a call or redirect an accessing MS to a target neighbor cell in such a way as to minimize co-channel interference in the cellular system.

Acampora discloses a system and method for controlling admission of new calls to a cellular telecommunication system. New calls are admitted or rejected on the basis of a number of factors such as classes of calls, number of calls in each class in each cell-cluster, traffic characteristics, quality-of-service requirements for each class, and scheduling policies at each base station. However, Acampora does not teach or suggest a method which collects signal strength measurements both from MSs which are involved in calls and from MSs which are currently camped on the DCCH waiting for system access. Likewise, Acampora does not teach or suggest a method which then calculates whether to hand off a MS currently involved in a call or to redirect an accessing MS to a target neighbor cell in such a way as to minimize co-channel interference in the cellular system.

Ueno discloses a method which enables a mobile station user to determine whether a handoff is to be performed in a cellular telecommunications network. A signal transmitted from the mobile station to the network causes the network to switch or hold the voice channel accordingly. However, Ueno does not teach or suggest a method which collects signal strength measurements both from MSs which are involved in calls and from MSs which are currently camped on the DCCH waiting for system access. In addition, Ueno does not teach or suggest a method which then calculates whether to hand off a MS currently involved in a call or to redirect an accessing MS to a target neighbor cell in such a way as to minimize co-channel interference in the cellular system.

Review of each of the foregoing references reveals no disclosure or suggestion of a system or method such as that described and claimed herein.

In order to overcome the disadvantage of existing solutions, it would be advantageous to have a method of collecting signal strength measurements from MSs which are involved in calls and from MSs which are currently camped on the DCCH waiting for system access. In addition, the method would then calculate whether to hand off a MS currently involved in a call or to redirect an accessing MS to a target neighbor cell in such a way as to minimize co-channel interference in the cellular system. The present invention provides such a method.

SUMMARY OF THE INVENTION

In one aspect, the present invention is a method of reducing co-channel interference in a cellular telecommunication system having a congested serving cell, a plurality of neighbor cells controlled by a mobile switching center (MSC), and an accessing mobile station attempting to access the cellular system in the serving cell. The invention is applicable to any cellular system that can measure downlink signal strength from neighboring cells on both the control channel and the traffic channel. The preferred embodiment is described in terms of systems operating under IS-136. The method begins by camping the accessing mobile station on the serving cell's digital control channel (DCCH), and fetching signal strength information from the accessing mobile station, the signal strength information including received signal strength at the accessing mobile station from the serving cell and the neighboring cells. This is followed by fetching signal strength information from a plurality of busy mobile stations involved in on-going calls in the serving cell, the signal strength information including received signal strength at each busy mobile station from the serving cell and the neighboring cells. This is followed by identifing a mobile station/target cell combination which causes the least co-channel interference when an identified mobile station is moved into an identified target cell. The MSC then determines whether the identified mobile station is the accessing mobile station, and if so, redirects the identified mobile station to access the cellular system in the identified target cell. If the MSC determines that the identified mobile station is a busy mobile station involved in a call, the method forces a handoff of the identified mobile station to the identified target cell.

The mobile station/target cell combination which causes the least co-channel interference may be identified by finding the difference, for each busy and camped mobile station in the network, between the maximum downlink signal strength from the serving cell, and the expected downlink signal strength from each neighboring cell. The method then identifies the mobile station/target cell combination for which the signal strength difference is numerically least.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
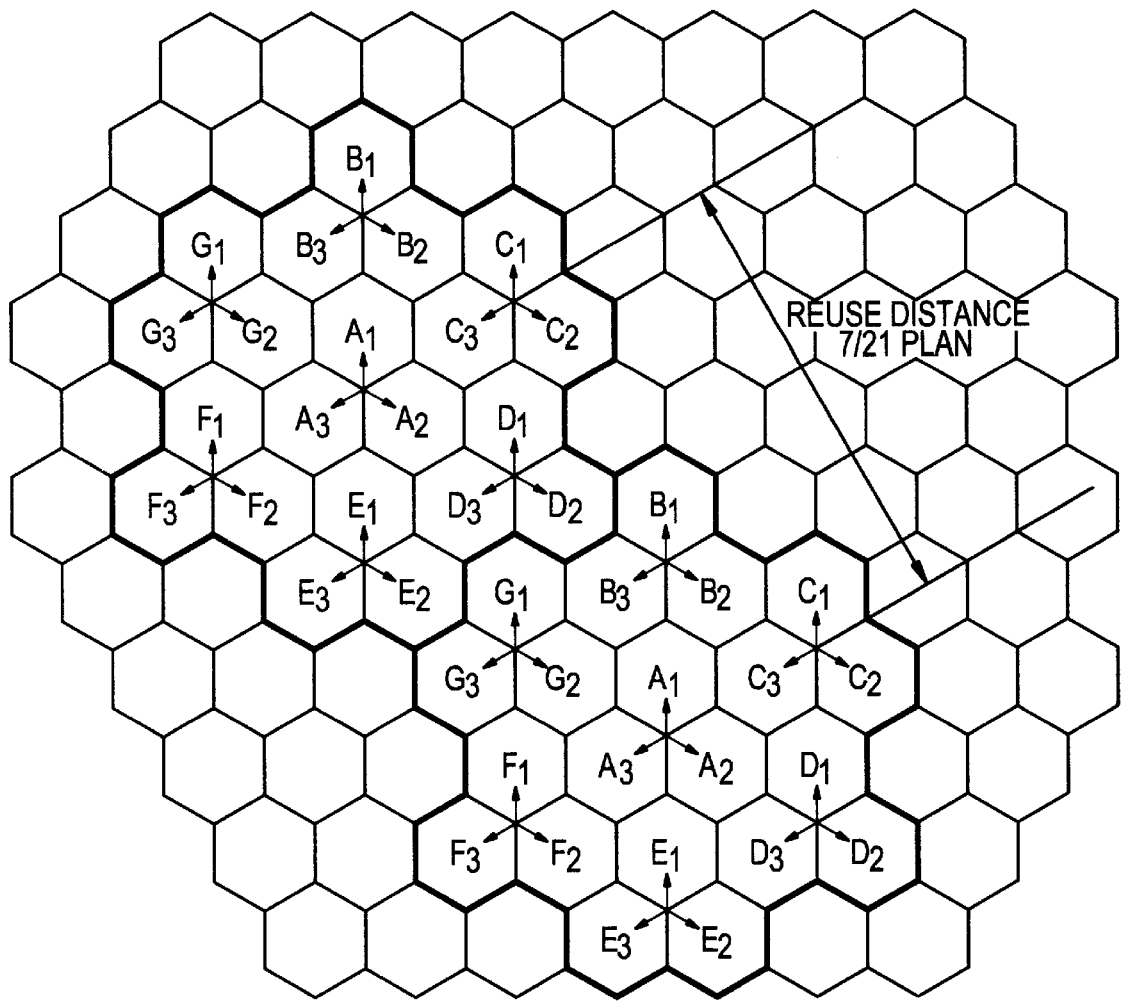
FIG. 1 (Prior Art) is an illustrative drawing of a network of cells in a typical cell plan in a cellular radio telecommunication system.

FIG. 1 is an illustrative drawing of a network of cells in a typical cell plan in a cellular radio telecommunication system. Each cell is labeled with a frequency designation, thereby generating a 7/21 frequency reuse plan. In order to minimize co-channel interference, a reuse distance is defined for the network, and base stations using the same frequencies are separated by the reuse distance. In FIG. 1 it can be seen, for example, that cells utilizing frequency C1 are separated by the reuse distance.

Figure 2:
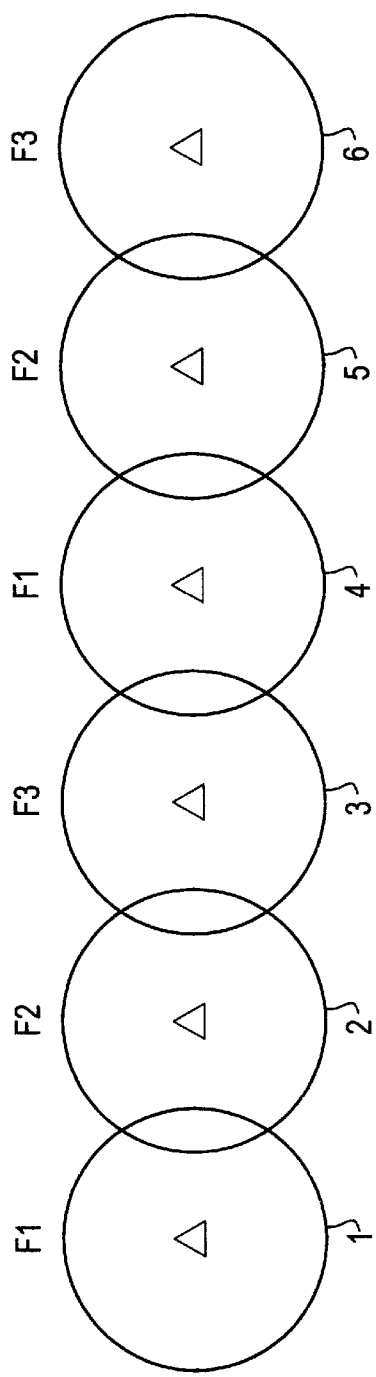
FIG. 2 is an illustrative drawing of a row of contiguous cells in the coverage area of a cellular radio telecommunication system suitable for implementing the method of the present invention.

FIG. 2 is an illustrative drawing of a row of contiguous cells 1–6 in the coverage area of a cellular radio telecommunication system suitable for implementing the method of the present invention. Base stations are illustrated as being in the center of each cell. In order to minimize co-channel interference, cells operating on the same frequency are separated by intervening cells which operate on different frequencies. In the example illustrated in FIG. 2, three frequencies are utilized. Cells 1 and 4 operate on frequency F1; cells 2 and 5 operate on frequency F2; and cells 3 and 6 operate on frequency F3. Thus, co-channel base stations are separated by three cell widths from each other.

Figure 3:
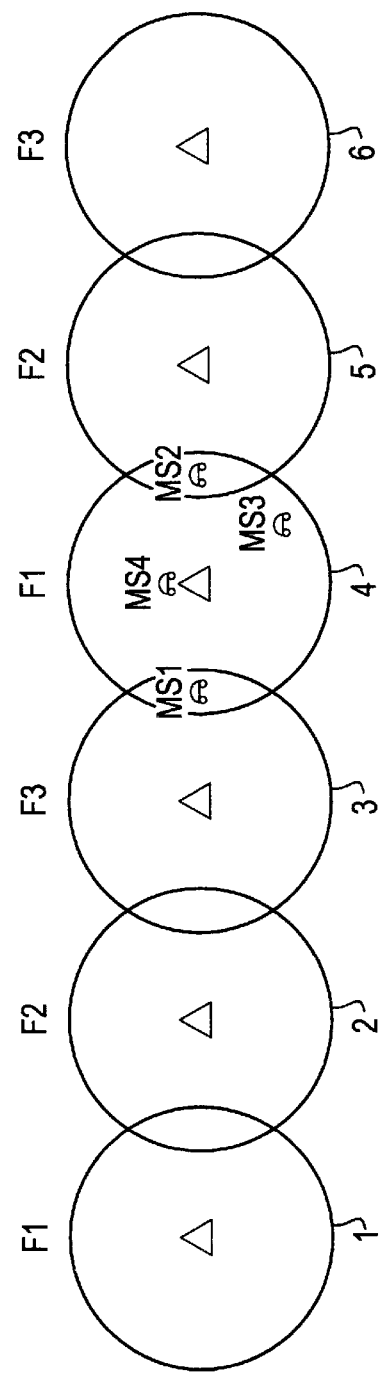
FIG. 3 is an illustrative drawing of the row of contiguous cells of FIG. 2 when one of the cells is congested.

FIG. 3 is an illustrative drawing of the row of contiguous cells 1–6 of FIG. 2 when one of the cells (cell 4) is congested. For exemplary purposes, assume that cell 4 operating on frequency F1 has three digital traffic channels (DTCs), and there are four MSs in cell 4: MS1–MS4. MS1, MS2, and MS3 are all engaged in calls. MS4 then attempts to access the system, but there is congestion because the three channels are occupied. In existing systems with directed retry capability, a number of directed retry cells are defined for the serving cell 4 (for example, cell 3 and cell 5). When MS4 is denied access due to congestion in cell 4, a list of the directed retry cells is sent to MS4. MS4 then tries to access the directed retry cell with the strongest signal strength. However, MS4 is illustrated very close to the base station for cell 4, and regardless of which directed retry cell MS4 accesses, the reuse distance will be substantially reduced. For example, if MS4 accesses cell 5, then MS4 would be operating on frequency F2 much closer to cell 2, the co-channel cell operating on frequency F2. Instead of a 3-cell separation, there would only be a 2-cell separation. This could cause higher co-channel interference and lower voice quality. Likewise, the reuse distance is similarly reduced if MS4 accesses cell 3. MS4 would then be operating on frequency F3 much closer to cell 6, the co-channel cell operating on frequency F2. Once again, instead of a 3-cell separation, there would only be a 2-cell separation, leading to higher co-channel interference and lower voice quality.

The present invention utilizes signal strength information from MS1–MS4 to determine whether to redirect MS4 to cell 3 or cell 5, or hand off MS1, MS2, or MS3 to make room for MS4 in cell 4. As noted above, if MS4 were to be redirected to cell 3 or cell 5, then the reuse distance would be substantially reduced. This could cause higher co-channel interference and lower voice quality. Therefore, it is better to hand off MS2 to cell 5, for example, and provide MS4 with access in cell 4.

MS1 is shown to be operating in cell 4 near the border with cell 3. Thus, an alternate solution is to force a handoff of MS1 to cell 3, and utilize the freed up channel in cell 4 to provide access to MS4. Co-channel interference will not be greatly impacted. Likewise, MS3 could be handed off to cell 5 and the freed up channel in cell 4 utilized to provide access to MS4. Co-channel interference may only be slightly affected. The present invention normally selects the MS/cell combination that provides the lowest interference situation. For the situation in which the voice quality impacts are the same for more than one MS/cell combination, it is preferable to retain an ongoing call on its existing channel and redirect the accessing MS to another cell with equivalent signal strength to the signal strength in the accessed cell.

In order to make the decisions regarding the potential effect on co-channel interference, the MSC needs signal strength information from mobile stations involved in calls as well as mobile stations which are camped on the Digital Control Channel (DCCH) awaiting access. In a procedure called Mobile Assisted Handoff (MAHO), MSs which are involved in calls report received signal strengths from their serving cell and neighboring cells in order to assist in the handoff decision. In a procedure called Mobile Assisted Channel Allocation (MACA), MSs which are camped on the DCCH measure signal strengths from their serving cell and neighboring cells and report the measurements to the MSC.

In the situation illustrated in FIG. 3, the MSC utilizes MAHO information from MS1, MS2, and MS3, and MACA information from MS4 to determine potential levels of interference, and make a decision regarding which MS to hand off or redirect.

Figure 4:
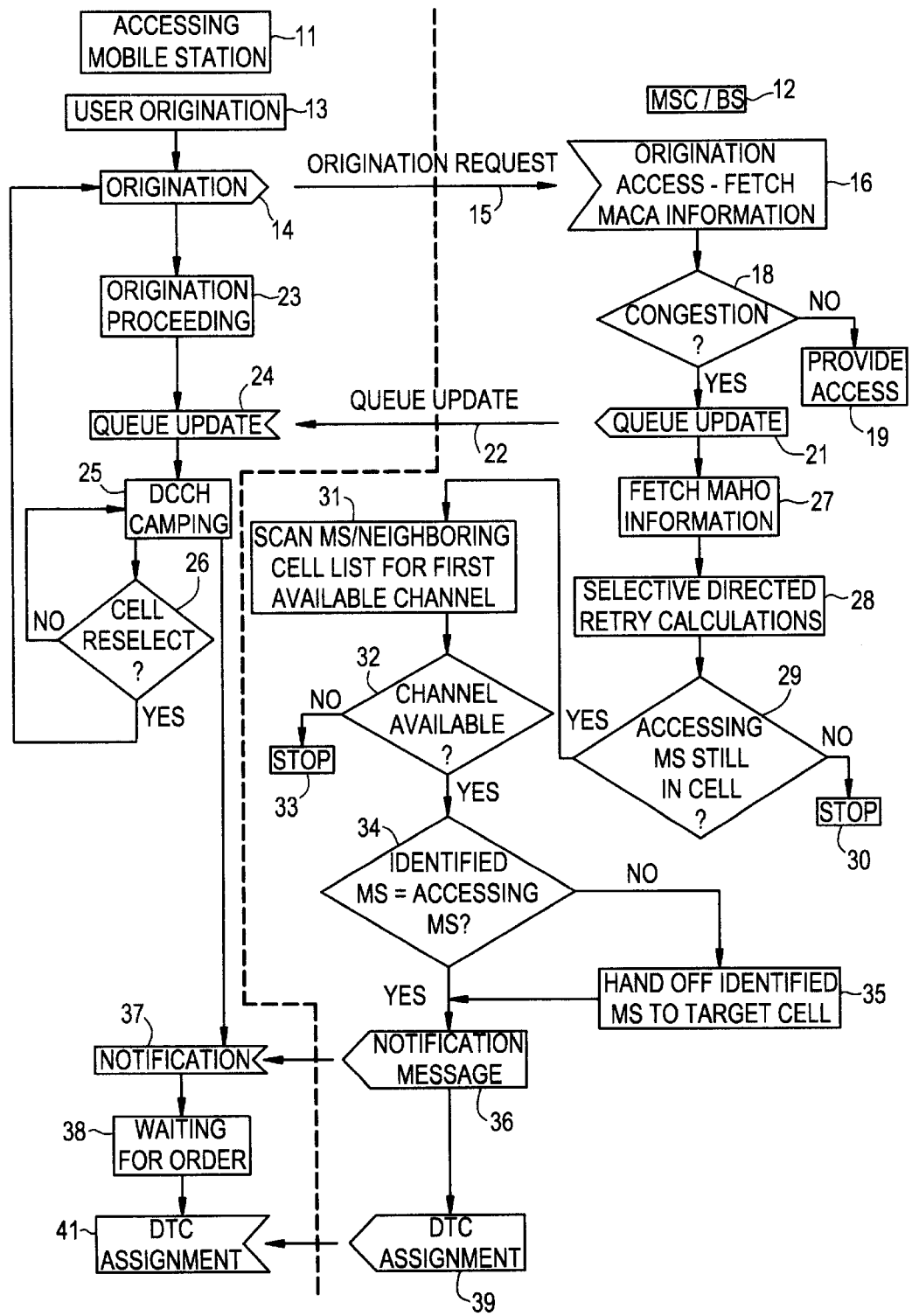
FIG. 4 is a flow chart illustrating the steps in the preferred embodiment of the present invention during an originating access by a mobile station.

FIG. 4 is a flow chart illustrating the steps in the preferred embodiment of the present invention during an originating access by a mobile station. The column on the left is what transpires in a MS 11 which is performing an originating access in the cellular system, and the column on the right illustrates corresponding steps performed in the serving MSC and/or base station (MSC/BS) 12. At step 13, a user makes an origination. An origination is begun in the accessing MS at 14, and an origination request message 15 is sent through the base station to the MSC. At 16, the MSC/BS begins an originating access and fetches the MACA signal strength information from the accessing MS 11. At step 18, the MSC/BS determines whether there is congestion in the cell where the accessing MS is located. If not, the MS is provided access at 19. However, if there is congestion, the MSC/BS starts a queue update process at 21 and sends a queue update message 22 to the accessing MS which informs the MS that there is currently no channel available.

In an IS-136 implementation, the accessing MS, which has been in the origination proceeding state at 23, receives the queue update message at 24, and then goes into the DCCH camping state at 25 and waits for more information. At step 26, if there is a cell reselection for any reason while the MS is camping, the MS automatically re-originates the call at step 14. For example, while camping, the MS continuously measures the signal strength of neighboring cells, and if a better serving cell is found, the MS reselects the better cell and automatically originates another call through the new serving cell.

While the accessing MS 11 is camping, the process moves to step 27 where the MSC fetches from the base station, the MAHO information for all the MSs involved in calls in the congested cell. The MSC/BS then performs selective directed retry calculations at 28 utilizing the MAHO information and the MACA information from the accessing MS 11. For all the MSs, the expected downlink signal strength from each neighboring cell is subtracted from the maximum downlink signal strength of the serving cell. The MS/Neighboring cell combinations are sorted from the more negative differences to the more positive differences. The MS/Neighboring cell combination with the numerically least signal strength difference generally has the least impact on the interference in the cellular system. From this list, the combination with an expected downlink signal strength from the neighboring cell lower than a predefined threshold is removed. If the same result is obtained for a MS accessing the system and a MS on an ongoing call, it is preferable to retain an ongoing call on its existing channel and redirect the accessing MS to another cell with equivalent signal strength to the signal strength in the accessed cell. The selective directed retry calculations are described in more detail below.

The MSC/BS then determines at step 29 whether the accessing MS 11 is still camping in the congested cell. The MS will not be in the congested cell any longer if it has performed a cell reselection and, therefore, an automatic origination in a new cell. If the MS is no longer in the congested cell, the process stops at 30. If the accessing MS is still camping in the congested cell, the process moves to step 31 where the MS/Neighboring Cell list is scanned, starting from the top, to identify the first cell where a channel is available to serve the call. At step 32, it is determined whether an available channel is found. If no channel can be found, the process is stopped at 33. Otherwise, the process moves to step 34 where it is determined whether the MS identified by the selective directed retry calculations is the accessing MS 11. If the identified MS is not the accessing MS 11, but is a MS which is already involved in a call, the process moves to step 35 where the MSC/BS 12 hands off the identified MS to the target cell. The process then moves to step 36.

Likewise, if it is determined at step 34 that the MS identified by the selective directed retry calculations is the accessing MS 11, the process moves to step 36, where the MSC/BS 12 sends a notification message to the accessing MS 11 directing the MS to go to a state in which it can receive a DTC assignment message. The accessing MS receives the notification message at 37 and goes into the waiting for order state at 38. The MSC/BS then sends the accessing MS a DTC assignment message at 39 which is received at 41. The DTC assignment message assigns the accessing MS to the channel which produces the lowest level of interference in the cellular system. This channel may be in the serving cell or a neighbor cell.

Figure 5:
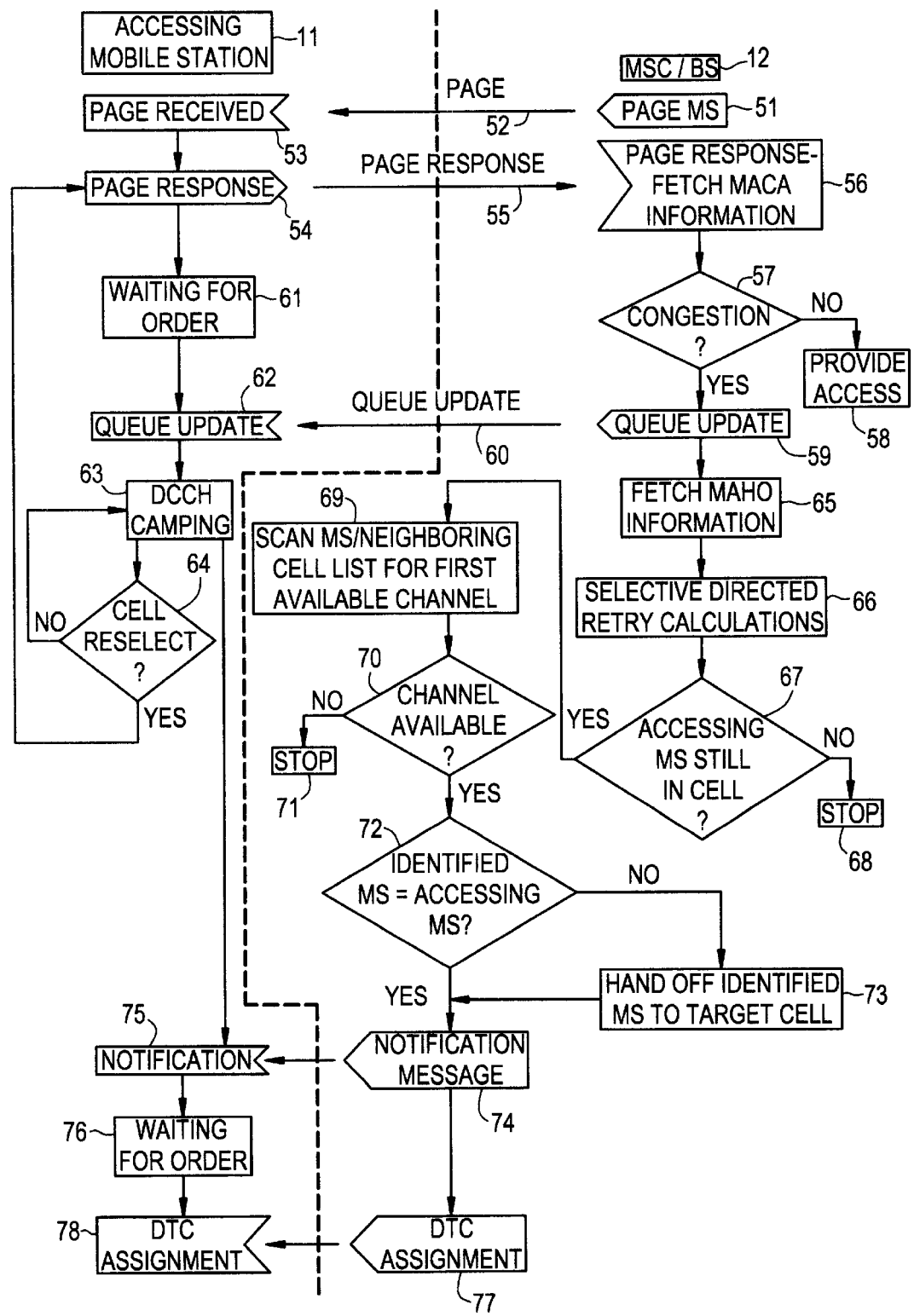
FIG. 5 is a flow chart illustrating the steps in the preferred embodiment of the present invention during a terminating access by a mobile station.

FIG. 5 is a flow chart illustrating the steps in the preferred embodiment of the present invention during a terminating access by a mobile station. The column on the left is what transpires in a MS 11 performing a terminating access in the cellular system, and the column on the right illustrates corresponding steps performed in the serving MSC/BS 12. At step 51, the MSC/BS 12 pages the MS 11. A paging signal 52 is sent through the base station over the air interface and is received at the MS at 53. The MS responds to the page at 54, and a page response 55 is transmitted over the air interface through the base station to the MSC. At 56, the MSC/BS receives the page response and fetches the MACA signal strength information from the accessing MS 11. At step 57, the MSC/BS determines whether there is congestion in the cell where the accessing MS is located. If not, the MS is provided access at 58. However, if there is congestion, the MSC/BS starts a queue update process at 59 and sends a queue update message 60 to the accessing MS which informs the MS that there is currently no channel available.

In an IS-136 implementation, the accessing MS, which has been in the waiting for order state at 61, receives the queue update message at 62, and then goes into the DCCH camping state at 63 and waits for more information. At step 64, if there is a cell reselection for any reason while the MS is camping, the preferred embodiment implements an auto-page response in the MS in which the MS automatically returns to step 54 and sends another page response to the new serving cell. This enables the cellular system to track the MS at the cell level in a manner similar to the auto-origination procedure.

While the accessing MS 11 is camping, the process moves to step 65 where the MSC 12 fetches from the base station, the MAHO information for all the MSs involved in calls in the congested cell. The MSC/BS then performs selective directed retry calculations at 66 utilizing the MAHO information and the MACA information from the accessing MS 11. As previously described, for all the MSs, the expected downlink signal strength from each neighboring cell is subtracted from the maximum downlink signal strength of the serving cell. The MS/Neighboring cell combinations are sorted from the more negative results to the more positive results. The MS/Neighboring cell combination on the top of the sorted list is expected to have the least impact on the interference in the system. From this list, the combination with an expected downlink signal strength from the neighboring cell lower than a predefined threshold is removed. If the same result is obtained for a MS accessing the system and a MS on an ongoing call, it is preferable to retain an ongoing call on its existing channel and redirect the accessing MS to another cell with equivalent signal strength to the signal strength in the accessed cell. The selective directed retry calculations are described in more detail below.

The MSC/BS then determines at step 67 whether the accessing MS 11 is still camping in the congested cell. The MS will not be in the congested cell any longer if it has performed a cell reselection and, therefore, an automatic page response. If the MS is no longer in the congested cell, the process stops at 68. If the accessing MS is still in the congested cell, the process moves to step 69 where the MS/Neighboring Cell list is scanned, starting from the top, to identify the first cell where a channel is available to serve the call. At step 70, it is determined whether an available channel is found. If no channel can be found, the process is stopped at 71. Otherwise, the process moves to step 72 where it is determined whether the MS identified by the selective directed retry calculations is the accessing MS 11. If the identified MS is not the accessing MS 11, but is a MS which is already involved in a call, the process moves to step 73 where the MSC/BS 12 hands off the identified MS to the target cell. The process then moves to step 74.

Likewise, if it is determined at step 72 that the MS identified by the selective directed retry calculations is the accessing MS 11, the process moves to step 74, where the MSC/BS 12 sends a notification message to the accessing MS 11 directing the MS to go to a state in which it can receive a DTC assignment message. The accessing MS receives the notification message at 75 and goes into the waiting for order state at 76. The MSC/13S then sends the accessing MS a DTC assignment message at 77 which is received at 78. The DTC assignment message assigns the accessing MS to the channel which produces the lowest level of interference in the cellular system. This channel may be in the serving cell or a neighbor cell.

The selective directed retry calculations of step 28 (FIG. 4) and step 66 (FIG. 5) begin by calculating the maximum downlink serving signal strength (MaxServSS) of all MSs in the cell utilizing the equation:

$$\text{MaxServSS}_i = \text{SSserv}_i + \text{ATT}_i - \text{BO}_{CC-DTC}, \text{ where:}$$

(a) $\text{SSserv}_i$ is the measured downii signal strength on the serving channel for $\text{MS}_i$. (units=dBm). This factor is obtained from the MAHO information for MSs connected to a DTC, and from the MACA information for MSs camping on the DCCH.

(b) $\text{ATT}_i$ is the attenuation of power relative to the maximum transmitted power on the DTC for $\text{MS}_i$. This factor takes into account the attenuation from any downlink power control algorithm. (units=dB). Note: $\text{ATT}_i=0$ for a MS accessing the cellular system.

(c) $\text{BO}_{CC-DTC}$ is the difference between the maximum transmitted power on the control channel and the maximum transmitted power on the DTC. (units=dB). Note: $\text{BO}_{CC-DTC}=0$ for MSs connected to a DTC. "Transmitted power" refers to the downlink power measured at the base station antenna terminal.

Each MS in the cell is identified by a number, and each neighboring cell is identified by another number. The expected downlink signal strength (ExpNeighSS) for each MS from each neighboring cell is calculated utilizing the equation:

$$\text{ExpNeighSS}_{i,j} = \text{SSNeigh}_{i,j} - \text{BO}_{CC-DTCj}, \text{ where:}$$

(a) i=the MS number.

(b) j=the neighbor cell number.

(c) $\text{SSNeigh}_{i,j}$ is the measured downlink signal strength for $\text{MS}_i$ from neighbor cell$_j$. (units=dBm). This factor is obtained from MAHO information for MSs connected to a DTC, and from the MACA information for MSs camping on the DCCH.

(d) $\text{BO}_{CC-DTCj}$ is the difference between the maximum transmitted power on the control channel and the DTCs of neighbor cell$_j$. (units=dB).

The difference ($\text{Diff}_{i,j}$) is then calculated between the maximum downlink signal strength on the serving channel for each MS and the expected downlink signal strength for each MS from each neighboring cell utilizing the equation:

$$\text{Diff}_{i,j} = \text{MaxServSS}_i - \text{ExpNeighSS}_{i,j}.$$

The calculated differences are then sorted and placed in an ascending list starting with the numerically least difference (i.e., from the more negative results to the more positive results). For example, assume $\text{MS}_1$ and $\text{MS}_2$ are in a serving cell (i.e., i=1,2), and there are two neighboring cells, Neighbor Cell$_1$ and Neighbor Cell$_2$ (i.e., j=1,2). There are four possible MS/Neighbor cell combinations, and the $\text{Diff}_{i,j}$ calculation may result in differences of −10, −5, −3, and +10 for the four possible MS/Neighbor cell combinations. The list would then be sorted in the following manner, and MS/Neighbor cell combination ij=1,2 is identified as causing the least interference in the cellular system.

| | | |
|---|---|---|
| $\text{MS}_1$ | Neighbor Cell$_2$ | $\text{Diff}_{1,2} = -10$ |
| $\text{MS}_2$ | Neighbor Cell$_1$ | $\text{Diff}_{2,1} = -5$ |
| $\text{MS}_1$ | Neighbor Cell$_1$ | $\text{Diff}_{1,1} = -3$ |
| $\text{MS}_2$ | Neighbor Cell$_2$ | $\text{Diff}_{2,2} = +10$ |

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claim is:

1. A method of reducing co-channel interference in a cellular telecommunication system having a congested serving cell, a plurality of neighbor cells controlled by a mobile switching center (MSC), and an accessing mobile station attempting to access the cellular system in the serving cell, said method comprising the steps of:

camping the accessing mobile station on the serving cell's digital control channel (DCCH);

fetching signal strength information from the accessing mobile station, said signal strength information including received signal strength at the accessing mobile station from the serving cell and the neighbor cells;

fetching signal strength information from a plurality of busy mobile stations involved in on-going calls in the serving cell, said signal strength information including received signal strength at each busy mobile station from the serving cell and the neighbor cells;

identifyig a mobile station/neighbor cell combination which causes the least co-channel interference when an identified mobile station is moved into an identified neighbor cell;

determining in the MSC whether the identified mobile station is the accessing mobile station;

redirecting the identified mobile station to access the cellular system in the identified neighbor cell, upon determining that the identified mobile station is the accessing mobile station; and forcing a handoff of the identified mobile station to the identified neighbor cell, upon determining that the identified mobile station is a busy mobile station involved in a call.

2. The method of reducing co-channel interference of claim 1 wherein said step of identifying a mobile station/neighbor cell combination which causes the least co-channel interference includes the steps of:

finding a difference, for each mobile station in the network, between the maximum downlink signal strength of the serving cell and the expected downlink signal strength from each neighbor cell; and identifying a mobile station/neighbor cell combination for which the difference between the maximum signal strength of the serving cell and the expected signal strength from the neighbor cell is numerically least, the combination identifying the identified mobile station and the identified neighbor cell.

3. The method of reducing co-channel interference of claim 1 further comprising, after the step of identifying a mobile station/neighbor cell combination which causes the least co-channel interference, the steps of:

determining whether the accessing mobile station is still in the serving cell; and stopping the process upon determining that the accessing mobile station is no longer in the serving cell.

4. The method of reducing co-channel interference of claim 3 wherein the step of determining whether the accessing mobile station is still in the serving cell includes determining that the accessing mobile station has performed a cell reselection and an automatic origination in one of the neighbor cells.

5. The method of reducing co-channel interference of claim 3 wherein the step of determining whether the accessing mobile station is still in the serving cell includes determining that the accessing mobile station has performed a cell reselection and an automatic page response in one of the neighbor cells.

6. The method of reducing co-channel interference of claim 1 further comprising, after the step of fetching signal strength information from the accessing mobile station, the steps of:

determining whether the serving cell is still congested; and providing access to the accessing mobile station upon determining that the serving cell is no longer congested.

7. A method of minimizing co-channel interference in a cellular telecommunication system having a congested serving cell, a plurality of neighbor cells controlled by a mobile switching center (MSC), a plurality of busy mobile stations engaged in calls, and a plurality of accessing mobile station attempting to access the cellular system in the serving cell, said method comprising the steps of:

fetching signal strength measurements from each of the plurality of accessing mobile stations, said signal strength measurements including received signal strength at each of the accessing mobile stations from the serving cell and the neighbor cells;

fetching signal strength measurements from each of the plurality of busy mobile stations, said signal strength measurements including received signal strength at each of the busy mobile stations from the serving cell and the neighbor cells; and minimizing co-channel interference in the cellular system, said minimizing step comprising the steps of:

identifying a mobile station/neighbor cell combination for which a difference between the maximum downlink signal strength of the serving cell and the expected downlink signal strength from each neighbor cell is the numerically least of all possible mobile station/neighbor cell combinations; and moving the identified mobile station to the identified neighbor cell.

8. The method of minimizing co-channel interference of claim 7 wherein the step of moving the identified mobile station to the identified neighbor cell includes the steps of:

determining in the MSC whether the identified mobile station is one of the plurality of accessing mobile stations;

redirecting the identified mobile station to access the cellular system in the identified neighbor cell, upon determining that the identified mobile station is one of the plurality of accessing mobile stations; and forcing a handoff of the identified mobile station to the identified neighbor cell, upon determining that the identified mobile station is one of the plurality of busy mobile stations.

9. The method of minimizing co-channel interference of claim 7 wherein the step of minimizing co-channel interference in the cellular system includes calculating the maximum downlink signal strength of the serving cell (MaxServSS$_i$) utilizing the equation:

$$MaxServSS_i = SSserv_i + ATT_i - BO_{CC\text{-}DTC},$$

where SSserv$_i$ is the measured downlink signal strength on the serving channel for a mobile station (MS$_i$), ATT$_i$ is attenuation of power on the serving channel relative to the maximum transmitted power on the digital traffic channel DTC) for MS$_i$, and BO$_{CC\text{-}DTC}$ is the difference between the maximum transmitted power on the digital control channel (DCCH) and the maximum transmitted power on the DTC.

10. The method of minimizing co-channel interference of claim 7 wherein the step of minimizing co-channel interference in the cellular system includes calculating the expected downlink signal strength from each neighbor cell (ExpNeighSS$_{i,j}$) utilizing the equation:

$$ExpNeighSS_{i,j} = SSNeigh_{i,j} - BO_{CC\text{-}DTCj},$$

where SSNeigh$_{i,j}$ is the measured downlink signal strength for MS$_i$ from neighbor cell$_j$, and BO$_{CC\text{-}DTCj}$ is the difference between the maximum transmitted power on the digital control channel (DCCH) of neighbor cell$_j$ and the digital traffic channels (DTCs) of neighbor cell$_j$.

* * * * *

UNITED STATES PATENT AND TRADEMARK OFFICE
CERTIFICATE OF CORRECTION

PATENT NO. : 6,081,713
DATED : June 27, 2000
INVENTOR(S) : Michel Desgagne

It is certified that error appears in the above-identified patent and that said Letters Patent are hereby corrected as shown below:

Column 3, line 12, delete "fmding" and substitute --finding-- therefor.
Column 4, line 26, delete "infornation" and substitute --information-- therefor.
Column 5, line 33, delete "downiink" and substitute --downlink-- therefor.
Column 6, line 8, delete "MSCABS" and substitute --MSC/BS-- therefor.
Column 6, line 51, delete "downink" and substitute --downlink-- therefor.
Column 7, line 24, delete "MSC/13S" and substitute --MSC/BS-- therefor.
Column 7, line 37, delete "downii" and substitute --downlink-- therefor.
Column 8, line 37, delete "claim" and substitute --claimed-- therefor.
Column 8, line 55, delete "identifyig" and substitute --identifying-- therefor.
Column 9, line 11, delete "identiiying" and substitute --identifying-- therefor.
Column 10, line 43, delete "DTC)" and substitute --(DTC)-- therefor.

Signed and Sealed this

Third Day of April, 2001

*Attest:*

NICHOLAS P. GODICI

*Attesting Officer*     *Acting Director of the United States Patent and Trademark Office*